United States Patent Office 3,506,714
Patented Apr. 14, 1970

3,506,714
PROCESS FOR THE PREPARATION OF METHYL (3 - LOWER ALKOXY - 4 - HYDROXYBENZYL)KETONES
David F. Hinkley, Plainfield, and John Budavari, Warren, N.J., assignors to Merck & Co. Inc., Rahway, N.J., a corporation of New Jersey
No Drawing. Filed Dec. 22, 1967, Ser. No. 692,689
Int. Cl. C07c *49/76;* A61k *27/00*
U.S. Cl. 260—590                           11 Claims

ABSTRACT OF THE DISCLOSURE

A process is described for the preparation of methyl (3-lower alkoxy-4-hydroxybenzyl)ketones involving a modification of the Darzen glycidic ester synthesis characterized by the use of an acid labile blocking group for the phenolic hydroxyl, a single unit operation and concomitant high yields. The product is an important intermediate in the synthesis of α-methyl-β-(3,4-dihydroxyphenyl)analine, a commercial antihypertensive compound.

---

This application is a continuation-in-part of the applicants' copending application, Ser. No. 405,591, filed Oct. 21, 1964, now abandoned.

This invention relates to a process for the preparation of substituted benzyl methyl ketones. More specifically, it relates to a processes for the preparation of methyl (3-lower alkoxy-4-hydroxybenzyl)ketones from 3-lower alkoxy-4-hydroxybenzaldehydes.

The methyl ketones which are produced in accordance with the improved process of our invention are basic intermediates in the synthesis of the valuable compound L-α-methyl-3,4-dihydroxyphenylalanine. This compound has been found, through clinical testing, to be a very valuable antihypertensive agent which is prescribed extensively for patients suffering from both mild and sever forms of hypertension. It is especially useful in cases of hypertension where kidney damage has occurred and in many cases of malignant hypertension.

Thus, for example, methyl vanillyl ketone prepared in aucordance with the improved process of our invention may be converted to the valuable α-methyl-3,4-dihydroxyphenylalanine by syntheses outlined in Method I.

METHOD I

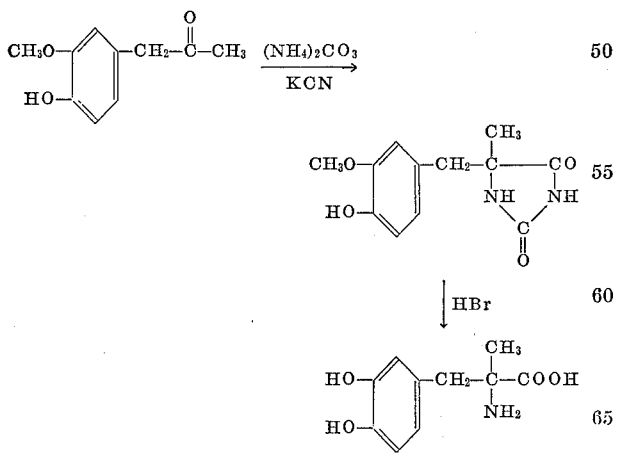

As outlined in Method I, the methyl aryl ketone produced by the process of this invention is reacted in aqueous solution with potassium cyanide and ammonium carbonate to form the corresponding hydantoin. The hydantoin is then heated in aqueous mineral acid solution to open the hydantoin ring and convert the methoxy substituent to a hydroxy substituent, resulting in the production of racemic α-methyl-3,4-dihydroxyphenalanine. The DL-racemate may then be resolved into its optically-active components by any conventional procedures and, in addition, the D and L isomers may be separated by seeding a supersaturated solution of the racemate with crystals of the desired isomer. Thus, if a supersaturated solution of the racemate is seeded with crystals of the desired L-α-methyl-3,4-dihydroxyphenylalanine, additional amounts of the L-isomer crystallize from solution, leaving the antipode dissolved. The crystallized L-isomer may then be separated by conventional means such as filtration.

A second and preferred method of converting the ketone of this invention to α-mehyl-β-(3,4-dihydroxyphenyl)alanine is as follows:

METHOD 2

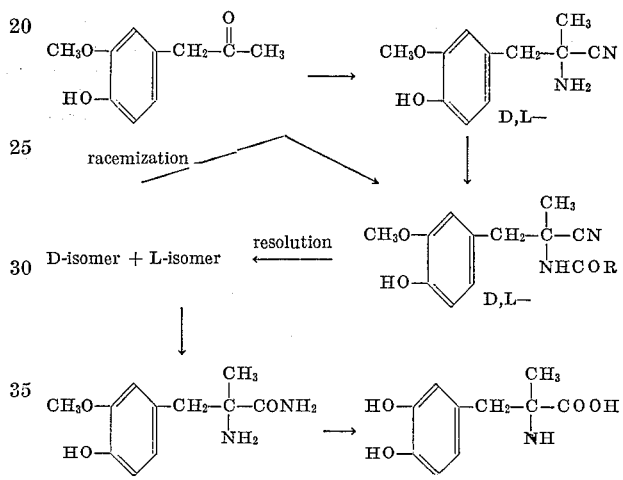

In this method, the methyl vanillyl ketone is reacted with ammonium cyanide in a lower alkanol to form the α-aminonitrile which is then acylated by warming in an alklanoic acid anhydride to form the corresponding α-acylaminonitrile. At this stage, the racemic material is resolved, preferably by direct crystallization; the D-isomer is racemized and recycled; and the L-isomer is hydrolysed to α-methyl-β-3,4-dihydroxyphenylalanine. In this procedure the 3-lower alkoxy-4-hydroxy structure is mandatory for both the resolution and the racemization steps.

The most attractive starting material, for either process from an economic point of view, for the production of L-α-methyl-β-3,4-dihydroxyphenylalanine, an important item of commerce, is vanillin (3-methoxy-4-hydroxybenzaldehyde). A commercial process based on this starting material was developed and put into operation. The later steps of the second and most important process requires that the 3-lower alkoxy and 4-hydroxy substituents on the ketone intermediate be intact. A sarch was instituted for a good method of preparing methyl 3-lower alkoxy-4-hydroxybenzyl ketone.

One method known for preparing methyl ketones from aldehydes utilizes the Darzen's homologation which involves contacting an aldehyde with an ester of a halo acid in the presence of a basic catalyst to produce a glycidic ester, i.e., an α,β-epoxy ester, followed by saponification of the ester, decarboxylation and simultaneous rearrangement to the desired methyl ketone. However, the Darzen's glycidic ester synthesis has not been and can not be conducted on phenolic aldehydes and ketones, since the phenolic function completely inhibits the reaction whether in the free phenolic or salt form. Of course the inhibiting properties of the phenolic group may be eliminated by converting it to an ether and then conducting the condensation. However such a devise suffers the pro- the condensation. However such a device suffers the prohibitive disadvantage that the simple ethers can not be cleaved to regenerate the phenolic ketone without gross damage to the ketone.

However it has now been found that the Darzen's glycidic ester synthesis may be used to produce unusually good yields of phenolic ketones provided that the phenolic group is protected from the strongly basic reaction conditions with an acid-labile group that can be easily removed without damage to the product phenolic ketone.

It has been found that 1-(lower alkoxy)-alkyloxy groups such as methoxymethyloxy and 1-ethoxyethyloxy and the like are completely stable under the strongly basic conditions employed in the condensation and saponification phase, and are quite labile under the acidic conditions of the rearrangement step and thus do not require a separate unit operation for their removal.

In accordance with the present invention 3-lower alkoxy-4-alkoxyalkyloxy benzaldehydes are converted by the base catalyzed condensation of alkyl α-halo propionates to the corresponding alkyl glycidic esters, which are then subjected to alkaline hydrolysis in situ to form the corresponding glycidic acid. The acid is immediately hydrolyzed, decarboxylated and rearranged, all in situ, to the desired methyl 3-lower alkoxy-4-hydroxybenzyl ketone in virtually quantitative over-all yield. This synthesis is outlined in Method III which follows:

METHOD III

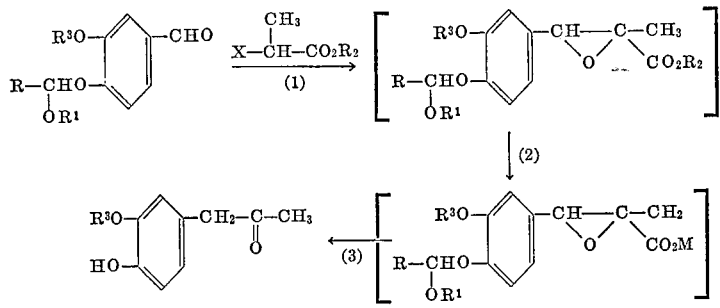

wherein R is hydrogen or lower alkyl of from 1 to about 3 carbon atoms; $R^1$ and $R^3$ are lower alkyl of from 1 to about 3 carbon atoms; $R_2$ is a lower alkyl radical of from 1 to about 5 carbon atoms; X is chloro or bromo; and M is an alkali metal.

In the first step of our improved process, the selected 3-lower alkoxy-4-alkoxyalkyloxybenzaldehyde is contacted in solution with about 1 to 2 moles of a strong base such as an alkali metal lower alkoxide, an alkali metal hydroxide, or an alkali metal hydride per mole of starting aldehyde. Examples of bases which are operative in the process of our invention are sodium methoxide, sodium ethoxide, sodium isopropoxide, potassium isopropoxide, potassium t-butoxide, potassium hydroxide, sodium hydroxide, or sodium hydride.

To the solution is added at least an equimolar amount of an alkyl ester of α-halopropionic acid at a temperature between about −80° C. and +100° C.

The propionate esters which are employed in our process include methyl α-chloropropionate, ethyl α-chloropropionate, propyl α-chloropropionate, isopropyl α-chloropropionate, butyl α-chloropropionate, isobutyl α-chloropropionate, amyl α-chloropropionate, methyl α-bromopropionate, ethyl α-bromopropionate, propyl α-bromopropionate, isopropyl α-bromopropionate, butyl α-bromopropionate, isobutyl α-bromopropionate and amyl α-bromopropionate.

The solvent employed is one which is inert under the conditions of the reaction. Thus, solvents such as ethers, e.g., ethyl ether, dioxane and tetrahydrofuran; lower-boiling saturated hydrocarbons, e.g., the hexanes, heptanes and octanes; aromatic hydrocarbons such as benzene, toluene and xylene, may be employed as solvents for the condensation reaction. It is preferred to carry out the reaction at a temperature about 0° C. to 50° C. Lower temperatures may be employed if desired, but are believed to be unnecessary in view of the excellent yields of product obtained in the preferred range.

The amount of reactants employed is believed not to be critical although at least 1 mole of the alkali metal alkoxide and 1 mole of the halo ester per mole of the aldehyde starting material should be employed to obtain maximum yields. We have found that optimum yields of the glycidic ester are obtained when a slight excess over 1 mole (approximately 30% in the case of the propionate ester and approximately 30% in the case of an alkali metal alkoxide) is used. It is also preferred that the alkyl group of the propionate ester and the alkoxide be the same. Thus, in the condensation reaction we prefer to employ sodium methoxide as the basic condensing agent and methyl α-chloropropionate as the halo ester component. The intermediate glycidic esters formed in the condensation reaction include the methyl, ethyl, propyl, isopropyl, butyl, isobutyl and amyl esters of α-methyl-α,β-epoxy-β-(3 - lower alkoxy-4-alkoxyalkyloxyphenyl)propionic acid.

Another key practical feature in our over-all process, apart from the novel use of the acid labile blocking group, is the treatment of the glycidic ester which results from the base catalyzed condensation of the substituted benzaldehyde and the halo propionate ester. Following the condensation reaction, outlined in Method III, the glycidic ester which results is treated without isolation with an aqueous solution of any alkali metal hydroxide such as sodium or potassium hydroxide to form the corresponding glycidic acid as the corresponding alkali salt. We have found that the normal method of neutralizing the basic condensing agent with acid and isolating the formed glycidic ester results in serious degradation of the ester and consequently in grossly lower yields of the desired product. Thus, in accordance with our improved process, an aqueous solution of an alkali metal hydroxide is added directly to the reaction mixture resulting from the condensation reaction. In accordance with a preferred embodiment of our process, the major portion of the inert solvent is removed from the condensation reaction mixture by distillation and then aqueous alkali metal hydroxide is added. The hydrolysis of the glycidic ester to the corresponding glycidic acid salt is then accomplished by heating the reaction mixture with the added alkali metal hydroxide to a tempertaure of from about 50° C. to 100° C. When hydrolysis of the ester is complete, normally in about 30 minutes at about 75° C., the glycidic acid salt may, if desired, be recovered by concentration of the reaction mixture and removal of the solvents but only with gross loss. Consequently, then the glycidic acid salt is used directly without isolation in the next phase of the process.

The alkali metal salt of the glycidic acid is then in alkaline solvent directly acidified with a strong mineral acid, e.g., hydrochloric acid, hydrobromic acid, sulfuric acid, phosphoric acid, and the like, and maintained at a temperature of about 100° C. for approximately 30 minutes. During this period the glycidic acid is decarboxylated and rearranged and the acid labile alkoxyalkyl group is simultaneously hydrolyzed to give the desired methyl (3-lower alkoxy-4-hydroxybenzyl)ketone. The aqueous reaction mixture is then cooled and extracted with a solvent for the substituted-benzyl methyl ketone, for example, toluene. The product is then conveniently isolated, if desired by distillation of the solvent, leaving the product as a residue in substantially pure form. The product obtained may be used directly in the synthesis of L-α-methyl-3,4-dihydroxyphenylalanine, as outlined in Method I.

The phenolic ketals of this invention may be prepared by the condensation of a chloromethyl ether with the phenolate anion of the phenolic aldehydes. The anion is prepared by treatment of the phenolic compound in a lower alkanol with an alkali metal, its alkoxide or hydroxide. Since the chloromethyl ethers are unstable in the presence of hydroxylic solvents, the lower alkanol is then replaced by an inert nonhydroxylic solvent such as benzene, toluene or the like and the chloromethyl ether is added, and the mixture is refluxed for from 2 to about 6 hours. After removal of the solvent by distillation, the residual oil is allowed to crystallize, or the solution of the product before removal of the solvent can be used directly in the Darzen's reaction sequence.

Another procedure employs the addition of the phenolic hydroxyl across the double bond of a lower alkyl 1-alkenyl ether, such as ethyl vinyl ether, and the like. The p-hydroxybenzaldehyde in a solvent such as benzene, toluene, or the like in the presence of a small amount of hydrochloric acid as catalyst, is treated with 1 to 2 moles of the lower alkyl 1-alkenyl ether and the solvent is warmed to from 50° C. to about 80° C. for from 3 to about 6 hours. The product is then, either isolated by standard techniques such as drying, neutralizing the catalyst and distillation of the solvent, or else it is used without isolation in the Darzen's synthesis.

Some of the preceding discussion and the following examples are restricted to vanillin derivatives. However, it is to be understood that the discussion and the reaction conditions of the examples apply equally well to other 3-lower alkoxy-4-hydroxybenzaldehydes, intermediates and products therefrom. The restriction to vanillin is made for ease of exemplification and because of the peculiar suitability of this chemical from the viewpoint of its availability and its economic attractiveness as a starting point for large scale commercial syntheses.

EXAMPLE 1.—METHYL VANILLYL KETONE

Step A.—Preparation of 3-methoxy-4-methoxymethyloxybenzaldehyde

To a solution of vanillin (228 g.) in methanol (700 ml.) at 25° C. is added a solution of sodium hydroxide (60 g.) in methanol (500 ml.) over a period of 30 minutes with stirring under nitrogen. The resulting thick slurry is heated to boiling and the methanol is replaced with 2.2 l. of toluene until a total of 2 l. of distillate is collected up to a constant boiling point of 110° C.

The slurry is cooled to 25° C. and sodium carbonate (11 g.) is added with stirring. Freshly distilled chloromethyl methyl ether (120.6 g.) is added over a 1 hour at 25° C. The slurry is aged 3 hours and then refluxed (58° C.) for 3 hours. The slurry is poured into 1 l. of 6% sodium hydroxide solution, the organic phase is separated, the aqueous phase is extracted with toluene (250 ml.) and the combined organic phases can be used directly in the next step after making up to the required volume with toluene.

Alternatively the oragnic phase can be concentrated to a residual yellow oil (231 g., 79% yield based on vanillin), which after standing overnight at 5° C. the 3-methoxy 4-methoxymethyloxy benzaldehyde crystallizes. Recrystallization of 200 g. from a mixture of 150 ml. benzene and 150 ml. hexane gave pure product, M.P. 39–41° C.

Analysis Calculated for $C_{10}H_{12}O_4$ (percent): C, 61.2; H, 6.12. Found (percent): C, 60.7; H, 6.31.

Step B.—Preparation of methyl vanillyl ketone

To a solution of 3-methoxy-4-methoxymethyloxybenzaldehyde (22.5 g., 0.115 mole) in toluene (450 ml.) obtained from Step A at 25° C. is added 13.5 g. of sodium emulsion containing 8.28 g. (0.345 mole) of sodium hydride under nitrogen. To this slurry is added methyl α-chloropropionate (41.4 g., 0.345 g.) at 25° C. with stirring. After 2¾ hours of stirring the reaction mixture is diluted with methanol (50 ml.) and 10% sodium hydroxide solution (125 ml.). The solution is heated one hour over steam and then diluted with concentrated hydrochloric acid (60 ml.) and heated a further 30 minutes over steam. After cooling, the organic layer is separated and concentrated by distillation. Fractional distillation of the residue gives 13 g. (63%) of pure methyl vanillyl ketone, B.P. 132°/0.6 mm.

EXAMPLE 2.—METHYL VANILLYL KETONE

Step A.—Preparation of 3-methoxy-4-(1-ethoxyethyloxy)benzaldehyde

Vanillin (152 g.), is added to toluene (250 ml.) with stirring. Concentrated hydrochloric acid (1.0 ml.) is added and stirring is continued for 5 minutes. To this solution is added ethyl vinyl ether (145 ml.) over 1 minute and the solution is heated with stirring to 60–65° C. over 45 minutes, and then at 65–70° C. for 4 hours. Sodium sulfate (5.0 g.) is then added and after 15 minutes, sodium bicarbonate (5.0 g.) is added and stirring at 60° C. is continued for 15 minutes. This solution is used directly in the next step.

Step B.—Preparation of methyl vanillyl ketone

To the solution obtained in Step A, is added methyl α-chloropropionate (159 g.) at 50–55° C. The heat source is removed and solid sodium methoxide (71 g.) is added during 60–90 minutes under a nitrogen atmosphere at 55–60° C. The mixture is then warmed to 70° C. over 30–45 minutes.

The volatiles (193–203 ml.) are removed by vacuum distillation at a batch temperature of 90–95° C. A solution of 14% sodium hydroxide (363 ml.) is added with vigorous stirring the mixture is then refluxed (85–87° C.) for 1.5 hours.

Concentrated hydrochloric acid (155 ml.) is added at 85° C. over 15 minutes, and the mixture is allowed to cool at 60° C. The aqueous layer is separated and extracted with 3×100 ml. of toluene. To the combined organic solutions is added solid sodium bicarbonate (10 g.) and after stirring for 15 minutes the mixture is filtered. Removal of the solvent by distillation provides a residual oil of methyl vanillyl ketone in 91% yield, of suitable purity for use in the synthesis of α-methyl-β-(3,4-dihydroxyphenyl)alanine.

What is claimed is:

1. A process for the preparation of methyl 3-lower alkoxy-4-hydroxybenzyl ketone which comprises mixing in an inert organic solvent a compound of formula

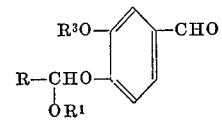

wherein R is a member selected from the group consisting of hydrogen, and lower alkyl and $R^1$ and $R^3$, are lower alkyl; a second compound of formula

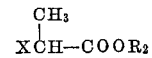

wherein $R_2$ is lower alkyl, and X is a member selected from the group consisting of chloro and bromo; and a base selected from the group consisting of an alkali metal hydride, an alkali metal hydroxide, and an alkali metal alkoxide, to form an $\alpha,\beta$-epoxy ester of formula

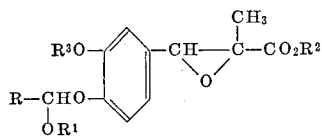

heating said ester without isolation with an aqueous alkali metal hydroxide to saponify said ester and produce the corresponding alkali metal salt of formula

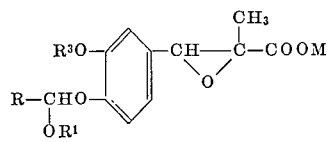

wherein M is an alkali metal cation and without isolation heating said salt with a strong mineral acid.

2. A process as claimed in claim 1 wherein the conversion of the aldehyde to the epoxide is effected at a temperature between about $-140°$ C. and $+100°$ C.

3. A process as claimed in claim 1, wherein the conversion of the $\alpha,\beta$-epoxy ester to $\alpha$-$\beta$-epoxy acid salt is conducted at a temperature between about 25° C. and 100° C.

4. The process as claimed in claim 1, wherein $R^3$ is methyl, and R, $R^1$ and $R^2$, X and M are as defined in claim 1.

5. The process as claimed in claim 1, wherein R is hydrogen, $R^1$ is methyl, and $R^2$, $R^3$, X and M are as defined in claim 1.

6. The process as claimed in claim 1, wherein R is hydrogen, $R^1$ and $R^3$ are methyl, $R^2$ is ethyl, X is chloro, and M is sodium cation.

7. The process as claimed in claim 1, wherein R is methyl, $R^1$ is ethyl, and $R^2$, $R^3$, X and M are as defined in claim 1.

8. The process as claimed in claim 1, wherein R and $R^3$ are methyl, $R^1$ and $R^2$ are each ethyl, X is chloro and M is sodium cation.

9. A process for the preparation of methyl vanillyl ketone which comprises mixing in an inert organic solvent a 3-methoxy-4-(1-lower alkoxy-lower alkyloxy) benzaldehyde, a lower alkyl $\alpha$-halopropionate and a base selected from an alkali metal hydride, an alkali metal alkoxide, and an alkali metal hydroxide followed by treatment with warm aqueous alkali metal hydroxide, followed by treatment with warm concentrated mineral acid.

10. The process as claimed in claim 9, wherein the 3-lower alkoxy-4-(1-lower alkoxy-lower alkyloxy)benzaldehyde is 3-methoxy-4-methoxymethyloxybenzaldehyde.

11. The process as claimed in claim 9, wherein the 3-lower alkoxy-4-(1-lower alkoxy-lower alkyloxy)benzaldehydehyde is 3-methoxy-4-(1-ethoxyethyloxy)benzaldehyde.

References Cited

FOREIGN PATENTS 727,405 12/1942 Germany.
752,328 10/1950 Germany.

DANIEL D. HORWITZ, Primary Examiner

U.S. Cl. X.R.

260—348, 600, 309.5, 519, 465, 559

UNITED STATES PATENT OFFICE
CERTIFICATE OF CORRECTION

Patent No. 3,506,714                    Dated April 14, 1970

Inventor(s) David F. Hinkley and John Budavari

It is certified that error appears in the above-identified patent and that said Letters Patent are hereby corrected as shown below:

Column 1, line 21, ...analine... should read "alanine".

Column 1, line 29, delete "a" before the word processes.

Column 1, line 38, ...sever... should read "severe".

Column 1, line 43, ...aucordance... should read "accordance".

Column 2, line 43, ...alklanoic... should read "alkanoic".

Column 2, line 59, ...sarch... should read "search".

Column 3, line 4, delete line 4 completely.

Column 5, line 26, ...reflexed... should read "refluxed".

Column 5, line 65, delete the word "a" before "1 hour".

Column 5, line 74, ...oragnic... should read "organic".

Column 6, line 5, delete "(percent)".

Column 6, line 6, delete "(percent)".

Column 6, line 11, insert the word "hydride" following sodium at the end of the line.

Column 6, line 68 (Claim 1, first structure) ...R-CHO... should read "RCHO".

Column 7, line 25, ...-140°C. ... should read "-40°C.".

Signed and sealed this 13th day of April 1971.

(SEAL)
Attest:

EDWARD M. FLETCHER, JR.
Attesting Officer

WILLIAM E. SCHUYLER, JR.
Commissioner of Patents